United States Patent [19]

Malsby et al.

[11] 4,190,316
[45] Feb. 26, 1980

[54] LENS CONNECTOR FOR OPTICAL FIBERS

[75] Inventors: Marc W. Malsby, Lake Arrowhead; John S. Doty, Yucaipa; Jayantilal N. Patel, Beaumont, all of Calif.

[73] Assignee: The Deutsch Company, Banning, Calif.

[21] Appl. No.: 874,558

[22] Filed: Feb. 2, 1978

[51] Int. Cl.² .............................................. G02B 5/14
[52] U.S. Cl. ..................... 350/96.18; 24/27; 24/261 R; 81/3 R; 350/96.21; 350/320
[58] Field of Search ............. 350/96.15, 96.18, 96.20, 350/96.21, 96.22, 320; 81/3 R; 29/278, 280; 24/27, 73 C, 115 H, 115 K, 261 R, 261 F

[56] References Cited

U.S. PATENT DOCUMENTS

| | | | |
|---|---|---|---|
| 2,524,562 | 10/1950 | Dawbarn | 24/27 UX |
| 3,113,799 | 12/1963 | Budnik | 24/261 R X |
| 3,805,337 | 4/1974 | Branstetter | 24/27 |
| 3,969,015 | 7/1976 | Le Noane | 350/96.22 |
| 3,990,779 | 11/1976 | McCartney | 350/96.21 |
| 4,047,797 | 9/1977 | Arnold et al. | 350/96.21 |
| 4,050,783 | 9/1977 | Tardy | 350/96.21 |
| 4,060,309 | 11/1977 | Le Noane et al. | 350/96.18 |
| 4,101,198 | 7/1978 | Heldt | 350/96.20 |
| 4,107,242 | 8/1978 | Runge | 350/96.20 X |
| 4,119,362 | 10/1978 | Holzman | 350/96.18 |

Primary Examiner—John K. Corbin
Assistant Examiner—John D. Lee
Attorney, Agent, or Firm—Gausewitz, Carr & Rothenberg

[57] ABSTRACT

This invention provides a connector for optical fibers which includes a receptacle within which is a lens member, with plugs being connected to the opposite ends of the receptacle so that optical fibers carried by the two plugs are in a light-transmissive relationship at the lens member. The plugs include forward tapered surfaces which are biased by resilient forces against tapered surfaces of the lens member for directly aligning the plugs with the lens member. Each of the plugs includes a back shell carrying a clamping member in which resilient pads are biased against the fiber to grip it without damaging it. Within the front shell the optical fiber is caused to bow in a predetermined direction which enables compensation to be made for any offset in the axes of the cavities in the lens member. There is also a cable clamp for retaining the cable of the optical fiber unit to the connector between tapered surfaces, and a tool with an expansible loop and a stop for associating the end portion of the cable with the tapered surfaces of the cable clamp.

44 Claims, 14 Drawing Figures

LENS CONNECTOR FOR OPTICAL FIBERS

BACKGROUND OF THE INVENTION

1. Field of the Invention

This invention relates to a connector for optical fibers.

2. Description of the Prior Art

Although it has been recognized for some time that systems transmitting light signals through optical fibers possess numerous advantages over electrical systems, their use has been very restricted and principally experimental. In large measure this is because there has been no satisfactory way of interconnecting the optical fibers within the system. Most optical fiber connectors have been suitable only for laboratory use as distinguished from field use, requiring meticulous adjustment by skilled personnel before any efficiency of connection can be achieved. Otherwise, losses are so great at the connector that the system becomes impractical.

An improved optical fiber connector is illustrated in U.S. Pat. No. 4,118,362 for OPTICAL FIBER CONNECTOR, in which the ends of optical fibers are biased into tapered cavities which terminate in arcuate lens surfaces in a light-transmissive member. An optical fluid occupies the space between the ends of the optical fibers and the lens surfaces. The tapered cavity surfaces cooperate with the edges of the fiber ends to accurately align the fibers with the cavities and hence with each other. With proper design, light then is efficiently transmitted through the optical fluid and the light-transmissive member from one fiber to the other, being refracted at the lens surfaces. Although this is an efficient means for coupling one fiber to another, there has remained a need for an improved connector device to cause the fibers to be associated with the lenses in the manner described above and which can be used in the field by unskilled personnel.

SUMMARY OF THE INVENTION

The connector of this invention includes a receptacle to which are connected identical plugs, each of which carries an optical fiber. Within the receptacle is a lens member of plastic or glass which has opposite outwardly facing tapered cavities defining lens surfaces at their inner ends. An optical fluid is retained in the cavities. The lens member includes tapered surfaces at either end which are engaged by similarly tapered surfaces on the forward ends of the front shells of the two plugs. The back shells of the plugs are moved forwardly relative to the front shells when the connector is mated, which is accomplished by coupling rings that engage shoulders on the back shells and thread onto the receptacle. Springs between shoulders on the front and rear shells bias the front shells forwardly as the connector is mated so that the tapered surfaces of the front shells are pressed against the tapered surfaces of the lens member. The interior of the receptacle is slightly larger than the exterior dimension of the lens member so that the lens member can float a limited distance relative to the receptacle. Consequently, the tapered surfaces of the front shells and of the lens member cooperate to precisely align the lens member with the plugs.

Each of the plugs includes a fiber clamp carried by the rear shell so that when the rear shell advances relative to the front shell, during mating of the connector, the fiber is pressed into the lens cavity. Conversely, the fiber is retracted when the connector is separated so that its end is within the plug and protected against damage.

Each of the clamps includes a resilient pad on either side of the fiber, with rigid clamping members that are urged together to force the pads around the fiber to grip the fiber. The amount of inward movement of the clamping members is limited so that although the fiber is securely gripped it is not damaged.

Within the front shell, the fiber is allowed to bow within a narrow slot, compensating for the excess length of the fiber as the rear shell is moved forwardly. The direction of the bow in the two fibers may be correlated with any offset that can be detected in the axes of the cavities of the lens member, to tilt the fiber ends slightly. This will help compensate for such cavity offset and enhance the efficiency of light transmission from one fiber to the other.

The invention also includes a cable clamp for gripping and retaining the cable that surrounds the light-conductive fiber of the optical fiber units. The cable clamp includes first and second clamping members, the first clamping member being inside the second and including a rearwardly convergent tapered surface. The first clamping member has an inner surface with a similar taper. The cable end is extended around the forward end of the first clamping member and doubled back between these two tapered surfaces. A nut then presses the second clamping member forwardly to grip the cable between the two tapered surfaces.

A tool allows the cable end to be associated with the first clamping member so that the cable clamp is readily assembled. This tool is of resilient wire, including handle portions and two loops, one of which is larger than the other. The larger loop can be expanded to extend over the tapered surface and grip the cable, while the smaller loop acts as a stop to limit the distance the larger loop is extended over the tapered surface.

DESCRIPTION OF THE PREFERRED EMBODIMENT

Figures 1, 3, 8:
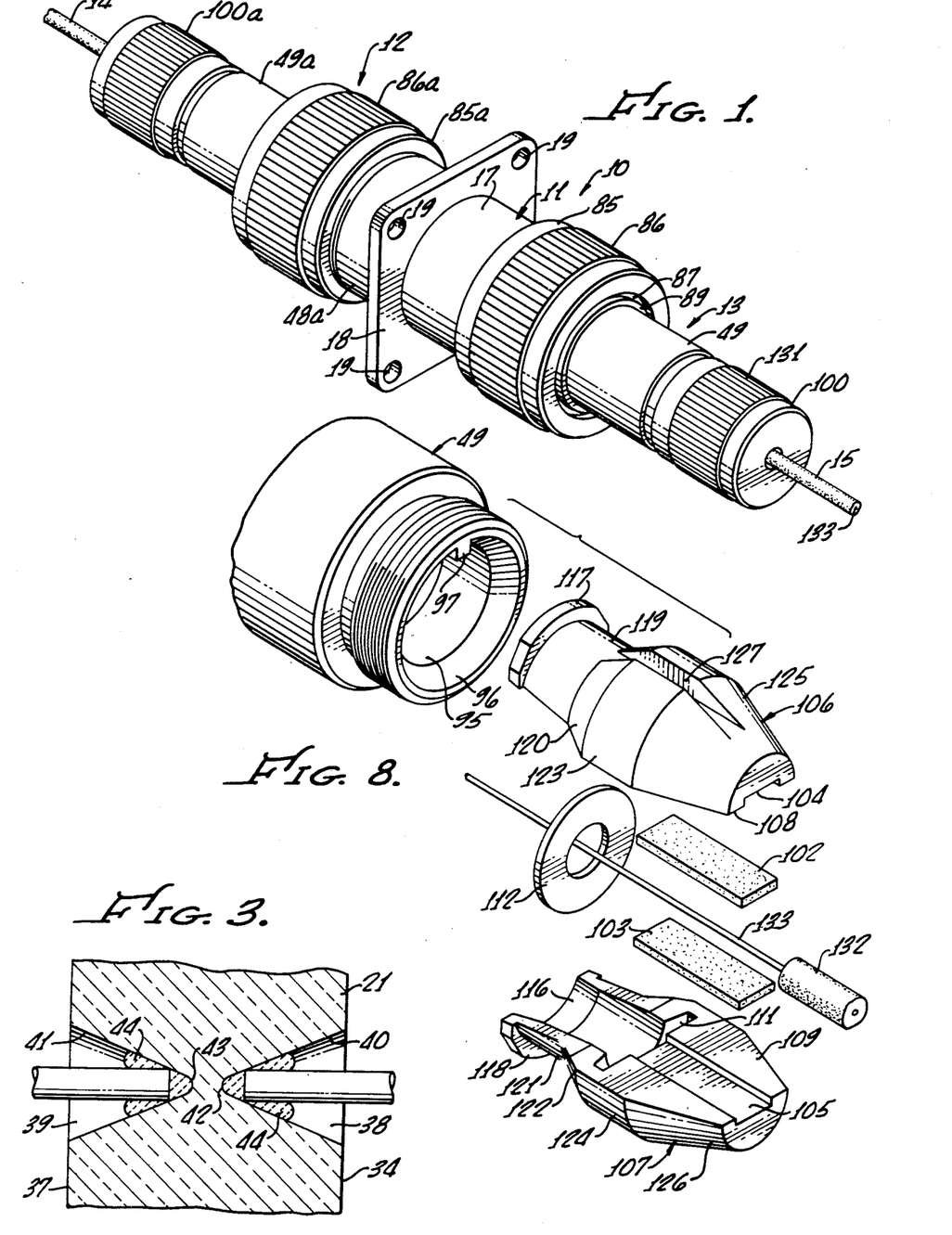
FIG. 1 is a perspective view of the optical fiber connector of this invention.
FIG. 3 is a further enlarged fragmentary longitudinal sectional view of the lens portion of the connector, illustrating the positioning of the optical fiber ends in the lens cavity.
FIG. 8 is an exploded perspective view of the arrangement for clamping the optical fiber.

The connector 10, as illustrated in FIG. 1, includes a central receptacle 11 to the ends of which are connected identical plug assemblies 12 and 13. These components connect optical fibers 14 and 15 to transmit light from one to the other.

The receptacle 11 includes a tubular shell 17, having a central flange 18, provided with openings 19 for mounting to a suitable support.

Figures 2, 5:
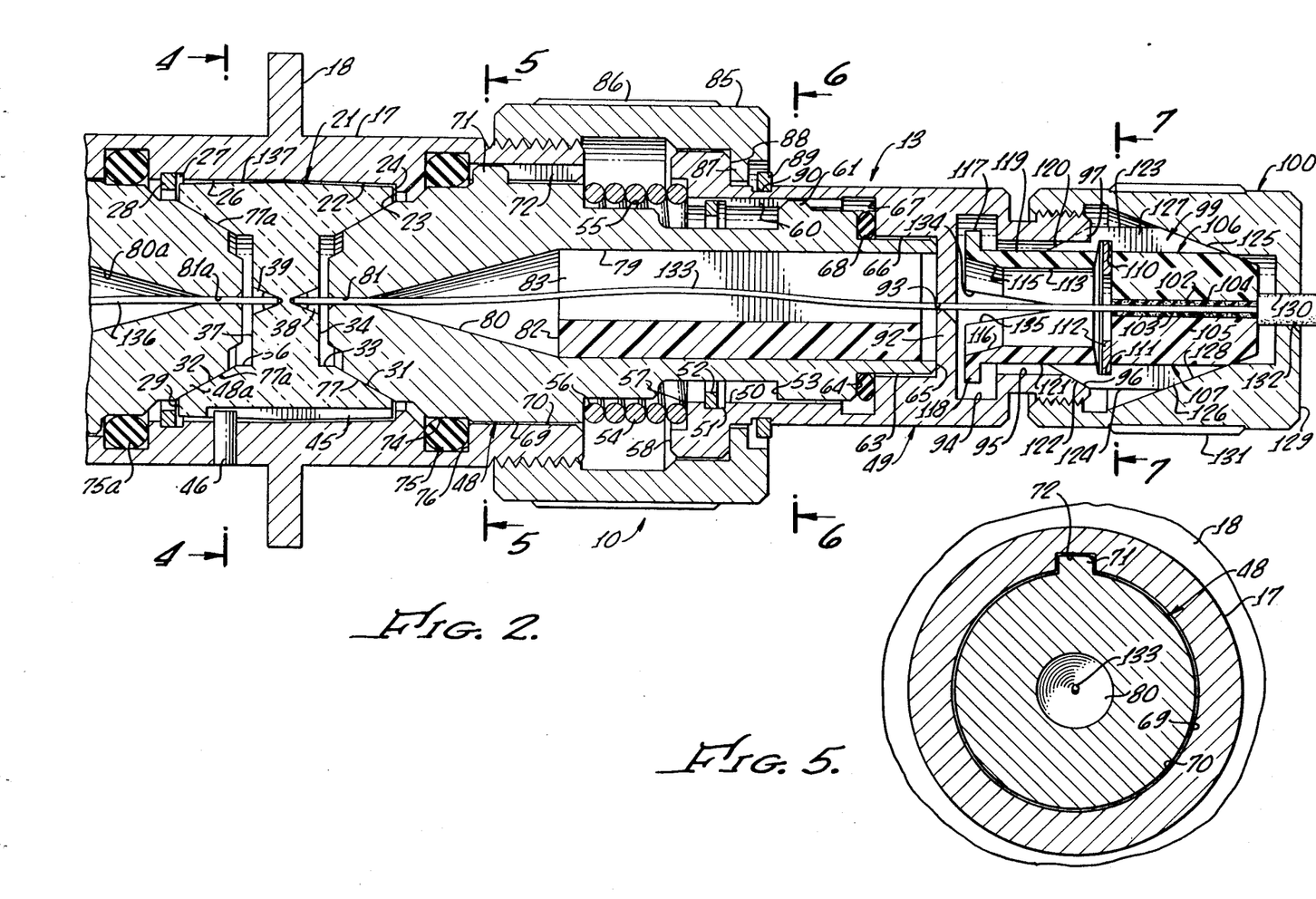
FIG. 2 is an enlarged fragmentary longitudinal sectional view of the connector.
FIGS. 4, 5, 6, and 7 are transverse sectional views taken along lines 4—4, 5—5, 6—6, and 7—7, respectively, of FIG. 2.
Figure 4:
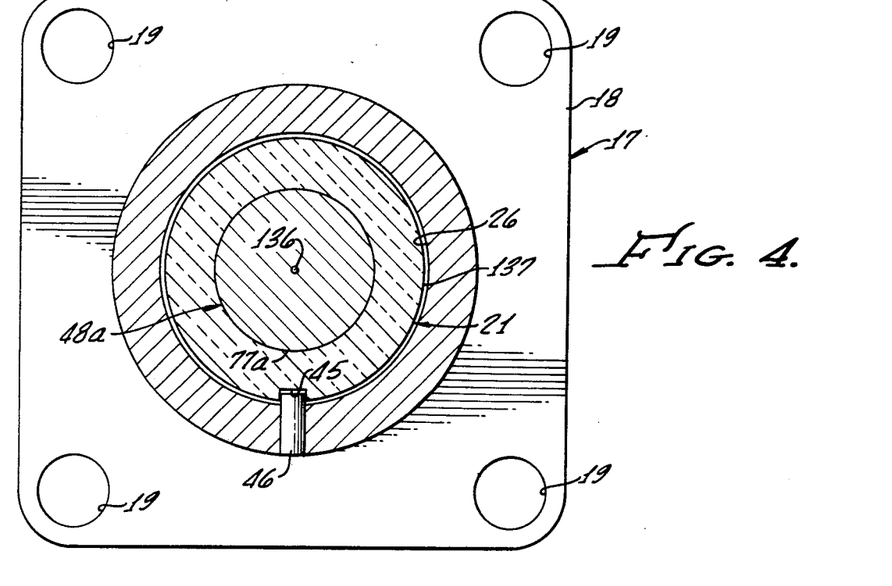

Within the shell 17, as seen in FIG. 2, is a lens 21 of a suitable transparent material, such as plastic or glass, to provide a connecting system for the optical fibers of the type disclosed in the aforementioned patent application for OPTICAL FIBER CONNECTOR. The interior of the shell 17 includes a frustoconical surface 22 at a shallow taper that circumscribes the right-hand portion of the lens 21, as the connector is shown in FIG. 2. The surface 22 terminates in a radially inwardly extending shoulder 23. The end 24 of the lens 21 is adjacent the shoulder 23 so that the shoulder 23 retains the lens against movement out of the receptacle shell toward the right-hand end.

The tapered surface 22 extends to the center of the shell 17 where it joins a cylindrical surface 26 within which is an annular recess 27. A split lock ring 28 fits in the recess 27 adjacent the left-hand end 29 of the lens 21. This retains the lens against movement out of the receptacle toward the left.

The lens 21 includes a frustoronical inwardly tapering surface 31 at its end 24 and a similar surface 32 at its end 29. At the inner end of the surface 31 is a short cylindrical section 33 which terminates at a radial face 34. The other end of the lens is symmetrical with a short cylindrical section 36 and a radial inner face 37. Cavities 38 and 39 are located at the axis of the lens 21, extending inwardly from the surfaces 34 and 37, respectively. These cavities, as seen in the enlarged view of FIG. 3, include frustoconical entrance portions 40 and 41, terminating at inner end portions 42 and 43, which are spherical segments. The inner ends of the cavities 38 and 39 are spaced apart, as illustrated. An optical fluid 44, of predetermined index of refraction, is located in the cavities 38 and 39.

In the outer surface of the lens 21, extending from the end 24 to a position adjacent the end 29, is a longitudinally extending keyway 45. This receives a pin 46 which extends radially through the wall of the shell 17, thereby rotationally positioning the lens 21 relative to the shell 17.

Only the plug assembly 13 is shown in complete detail in FIG. 2, in view of the fact that the plugs 12 and 13 are identical. The plug 13 includes a front shell 48 and a rear shell 49, both of which are tubular. The forward section of the rear shell 49 fits around the rearward portion of the front shell 48 in a telescoping relationship. As a result, the rear shell is movable axially relative to the front shell and is guided by the interengagement of the two shells. The forward inner surface 50 of the rear shell 49 is cylindrical and provided with an annular recess 51, which receives a split lock ring 52. This lock ring projects inwardly to interfere with a shoulder 53 on the exterior of the rearward portion of the front shell 48, which prevents the rear shell 49 from sliding off the front shell 48 when the plug is not mated with the receptacle, as in FIG. 9.

A compression spring 54 circumscribes the intermediate portion 55 of the front shell 48, with one end of the spring engaging a rearwardly facing external radial shoulder 56 on the front shell. The opposite end of the spring 54 bears against a radial surface 57 just inwardly of the forward end 58 of the rear shell 49. This biases the rear shell 49 rearwardly relative to the front shell 48 so that when the plug 13 is disconnected from the receptacle 11, the lock ring 52 is caused to bear against the shoulder 53 of the front shell 48.

The inner surface 50 of the rear shell 49 is provided with a longitudinally extending keyway 60 which receives a key 61 projecting outwardly from the outer circumferential surface 62 of the front shell 48. The keyway 60 and key 61 prevent relative rotation of the front shell 48 and the rear shell 49.

The outer circumferential surface 63 at the rearward end of the front shell 48 is of reduced diameter, thereby providing a rearwardly facing shoulder 64 spaced inwardly of the rearward end surface 65 of the front shell. The rear shell 49 has an inner circumferential surface 66 which fits around the surface 63 when the connector is mated, terminating at its forward end in a radial shoulder 67. An O-ring 68 circumscribes the front shell 48 at the surface 63 and, when the plug 13 is attached to the receptacle, is compressed between the shoulders 64 and 67, forming a seal.

Forwardly of the shoulder 56, the external surface 69 of the front shell 48 is dimensioned to fit closely within the end of the receptacle shell 17 at the internal surface 70 of the latter member. A key 71 projects outwardly from the surface 69 of the front shell 48 and fits within a keyway 72, extending longitudinally of the surface 70 of the receptacle shell 17, thereby indexing the plug and preventing relative rotation between the plug 13 and receptacle 11.

Forwardly of the circumferential surface 69, the front shell 48 has a relatively short surface 74 of slightly reduced diameter which, when the plug and receptacle are assembled, is engaged by an O-ring 75 to provide a seal. The O-ring 75 is received in an annular recess 76 in the receptacle shell 17.

Beyond the surface 74 the front shell 48 includes a frustoconical surface 77, which is tapered at the same angle as the surface 31 of the lens 21. In the assembled condition, the surface 77 of the front shell 48 engages the lens surface 31.

Interiorly the front shell 48 includes a cylindrical surface 79, which extends forwardly from the rearward end 65 beyond the mid-portion of the front shell. At the inner end of the surface 79 is a forwardly tapering frustoconical surface 80, terminating at a cylindrical opening 81, having a relatively small diameter.

Figures 6, 7:
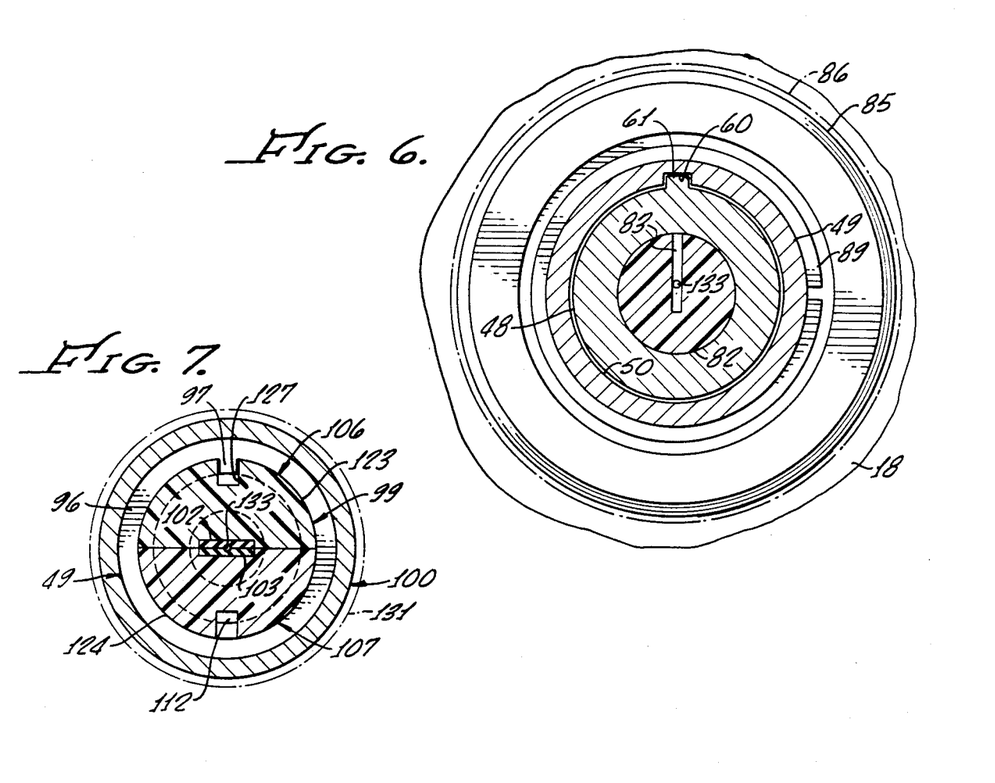

An insert 82 fits within the cylindrical opening 79 of the front shell 48 and is bonded in position. This insert is solid except for a narrow slot 83, seen in FIG. 6, which extends radially more than half way through the insert 82 and is the full length of the insert. The slot 83 is aligned rotationally with the key 71.

Circumscribing the front shell 48 is a coupling ring 85, having a straight knurl 86 on its exterior surface for manual rotation. The forward end 86 of the coupling ring 85 is internally threaded to mate with external threads on the right-hand end portion of the receptacle shell 17. At the rearward end of the coupling ring 85 is a radially inwardly extending flange 87 that fits behind a rearwardly facing shoulder 88 on the rear shell 49. Behind the flange 87 of the coupling ring 85 is a split lock ring 89 that fits within an annular recess 90 in the external surface of the rear shell 49. The lock ring 89 and the shoulder 88 prevent the coupling ring 85 from escaping from its position around the plug.

At the rearward end portion of the rear shell 49 is a radial wall 92, having a relatively small central opening 93. When the plug and receptacle are assembled, as illustrated in FIG. 2, the wall 92 engages the rearward end 65 of the front shell 48.

Rearwardly of the wall 92 the interior of the rear shell 49 includes a relatively large diameter portion 94, beyond which is a cylindrical surface 95 of smaller diameter. Adjacent the rearward end, the interior of the rear shell 49 includes an outwardly tapering frustoconical surface 96. A key 97 extends inwardly of the frustoconical surface 96, with its inner edge forming an extension of the cylindrical surface 95.

A fiber clamp 99 is located at the rearward end of the plug and circumscribed by a back shell nut 100. The clamp 99, as shown in FIG. 2 and the exploded view of FIG. 8, includes two flat rectangular pads 102 and 103 of elastomeric material. These fit within complementary recesses 104 and 105, respectively, in rigid pressure members 106 and 107. The latter members are of half-round configuration and include flat radial surfaces 108 and 109 along their sides which are their mating faces.

Forwardly of the recesses 104 and 105, the members 106 and 107 include narrow, deep semicylindrical recesses 110 and 111, which together receive a washer 112 that prevents relative longitudinal movement of the members 106 and 107.

Forwardly of the recesses 110 and 111 the members 106 and 107 include semicylindrical inner surfaces 113 and 114 connecting to frustoconical surfaces 115 and 116 that diverge to the forward end.

Exteriorly the members 106 and 107 include outwardly projecting flanges 117 and 118 that fit within the recess defined by the surface 94 of the rear shell 49, preventing escape of the clamp from the plug. Inwardly of the flange 118 of the member 106 is an exterior cylindrical surface 119 connnected to a rearwardly flaring surface 120 that is a segment of a cone. Similarly, the member 107 has a semicylindrical surface 121 and a tapered surface 122 which is a segment of a cone. Rearwardly of the surfaces 120 and 122, the members 106 and 107 have semicylindrical surfaces 123 and 124, beyond which are tapered surfaces 125 and 126 which are conical sections and converge toward the rear. A keyway 127 extends axially of the member 106 at the surfaces 120, 123, and 125. A similar keyway may be formed in the member 107 to economize manufacture by making the parts 106 and 107 identical.

The back shell nut 100 includes internal threads at its forward end which are adapted to mate with external threads on the rearward end of the rear shell 49. The intermediate interior portion of the back shell nut 100 defines a rearwardly convergent tapered surface 128 which is frustoconical and at the same angle as the surfaces 125 and 126 of the clamp members 106 and 107. At the rearward end, the back shell nut has a radial wall 129, through which is an opening 130. The exterior of the back shell nut 100 has a straight knurl 131 to enable the nut to be rotated by hand.

The optical fiber 15, which extends into the plug 13, includes a protective sheath 132 within which is the lightconductive fiber 133. The sheath 132 fits snugly within the opening 130 in the back shell nut and extends to the rearward end of the clamping members 106 and 107. However, the sheath is stripped from the fiber 133 within the plug so that the fiber extends through the clamp and into the front shell 48. The fiber 133 fits closely within the opening 93 in the wall 92 of the rear shell 49 as it enters the plug, where it passes through the slot 83 of the insert 82. The forward end of the fiber extends through the opening 81 in the front shell, where it is closely received, to enter the lens cavity 38.

Prior to attaching the plug 13 to the receptacle 11, the optical fiber 133 is extended into the plug and the two sections of the fiber clamp 99 are positioned one on either side of the fiber. The forward adjacent surfaces 134 and 135 of the clamp members 106 and 107 flare forwardly and radially outwardly. This enables the forward portion of the fiber clamp to be compressed, reducing its radial dimension at the flanges 117 and 118. In this way the flanges 117 and 118 can be moved through the end of the rear shell 49 at the circumferential surface 95 to enter the recess at the circumferential surface 94 of larger diameter. The flanges 117 and 118 are narrower at their side portions, adjacent the surfaces 134 and 135, so that there is ample clearance at those locations to pass through the opening defined by the surface 95.

Next, the back shell nut 100 is tightened onto the rearward end of the rear shell 49. This causes the tapered surface 128 of the back shell nut to bear against the tapered surfaces 125 and 126 of the clamping members 106 and 107, urging these members forwardly and inwardly. The forward tapered surfaces 120 and 122 of the clamping members 106 and 107 thereby are pressed against the tapered surface 96 at the rearward end of the rear shell 49. The reactions of the tapered surfaces cause the clamping members 106 and 107 to be pressed radially toward each other to bring their mating surfaces 108 and 109 into firm engagement. This in turn causes the resilient pads 102 and 103 to bear against and grip the fiber 133, but without damaging the fiber because the clamping force is limited by the engagement of the surfaces 108 and 109 which terminate the inward movement of the members 105 and 106. Also, the key 97, fitting in the keyway 127, prevents rotation of the fiber clamp 99 as the fiber is gripped.

With the optical fiber held in the plug 13, it is then attached to the receptacle 11 by threading the coupling ring 85 onto the external threads of the receptacle shell 17. As this occurs, the coupling ring, through the flange 87, presses forwardly on the rear shell 49 at the shoulder 88, sliding the rear shell forwardly over the front shell 48 until the wall 92 of the rear shell 49 engages the end 65 of the front shell 48.

The forward movement of the rear shell, reacting through the shoulder 57, causes the spring 54 to press against the shoulder 56 of the front shell 48 to bias the front shell forwardly. The forward frustoconical surface 77 of the front shell 48 engages the frustoconical surface 31 of the lens 21, however, so that the front shell does not move forwardly, but is pressed against the lens surface 31 by the resilient force of the spring.

As the rear shell 49 is moved forwardly relative to the front shell 48, and hence relative to the lens 21, the fiber 133 also is moved forwardly. This occurs because the fiber 133 is gripped at the clamp 99 which, through the back shell nut 100, is connected to the rear shell 49. This moves the end of the fiber 133 into the lens cavity 38 to engage the tapered cavity surface 40. This positions the end of the fiber adjacent the inner cavity surface 42 and aligns the fiber axis with the optical axis of the lens, as set forth in the aforementioned patent application for OPTICAL FIBER CONNECTOR. The optical fluid 44 within the cavity 38 is displaced by the fiber end 133 so that it occupies the space between the fiber end and the inner cavity surface 42, with some additional fluid around the peripheral of the fiber. An excess of the fluid 44 is provided to be sure that the cavity is entirely filled beyond the fiber end.

The fiber 133, forwardly of the clamp 99, is longer than the distance between the clamp and the inner end of the lens cavity 38, which causes the fiber to bow within the front shell 48 at the location of the tapered surface 80 and within the slot 83 of the insert 82. The width of the slot 83 is close to the diameter of the fiber 133 so that the direction of the bow in the fiber is closely controlled by the direction of the slot 83.

The plug 12 is identical to the plug 13 so that it connects to the receptacle 11 in the same manner as does the plug 13. Connection of the plug 13 to the receptacle 11 causes the light-conductive fiber 136 of the optical fiber unit 14 to enter the cavity 39 and bear against the tapered surface 41. This aligns the fiber 136 with the axis of the cavity 39 and so with the axis of the fiber 133 so that light can be transmitted between these two fibers. Optical fluid 44 in the cavity 39 fills the space between the end of the fiber 136 and the cavity surface 43 after the fiber enters the cavity.

The components of the plug 12 are given the same reference numbers as the corresponding components of the plug 13, but with the suffix "a."

When the plug 12 is connected to the receptacle 11, the frustoconical surface 77a of its front shell 48a is caused to bear against the tapered lens surface 32 in a manner similar to that occurring on the opposite side of the lens. The lens 21 has a smaller external dimension than the dimensions of the space within the receptacle shell which it occupies, so that it can float a limited distance within the receptacle shell. The outer surface 137 of the lens tapers slightly toward either end to facilitate angular as well as rectilinear floating movement. This enables the lens 21 to be aligned precisely with the plugs 12 and 13 by the interengagement of the tapered surfaces of the front plug shells with the tapered lens surfaces. This direct centering of the plugs with the lens helps to accurately align the fibers 133 and 136 with the lens cavities 38 and 39.

Figure 9:
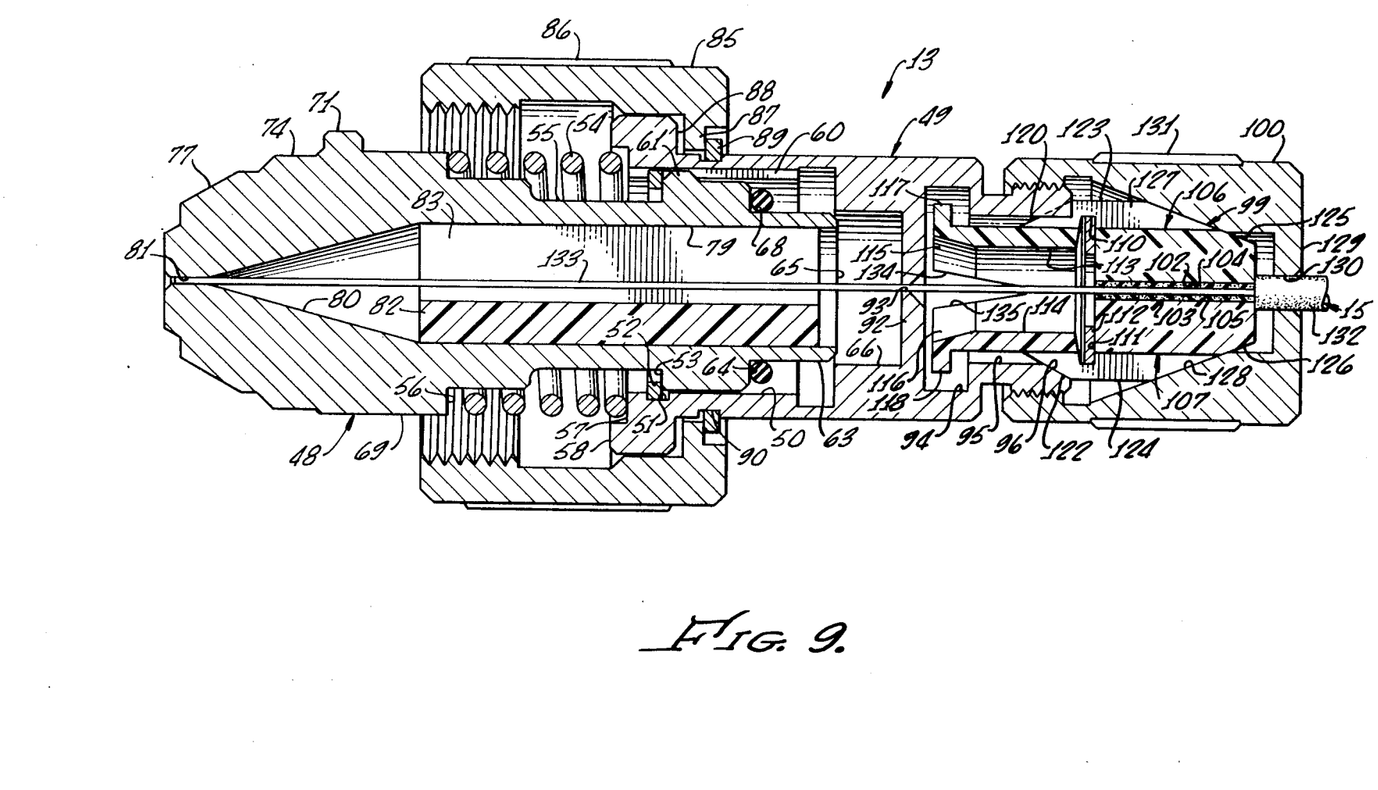
FIG. 9 is a longitudinal sectional view of one of the plugs separated from the receptacle of the connector.

The spring of the plug that biases the front shell against the tapered lens surface when the connector is mated also moves the rear shell rearwardly when the plug is disconnected. For the plug 13, as shown in FIG. 9, the spring 54 shifts the rear shell 49 rearwardly relative to the front plug 48 until the lock ring 52 is stopped by engagement with the shoulder 53 of the front shell 48. This movement of the rear shell 49 causes the fiber clamp 99 to move the fiber 133 also to the rear relative to the front shell. As a result, the forward end of the fiber 133 is retracted back into the opening 81 in the front shell 48. Therefore, the fiber 133 does not project outwardly where it can be damaged when the plug is disconnected, instead being inside the plug and fully protected. This is especially advantageous for an optical fiber connector suitable for field use, in view of the extreme vulnerability of optical fibers to damage. Of course, the length of the fiber 133 forwardly of the clamp 99 must be correlated with the travel of the rear shell 49 to assure full retraction when disconnected and enough extension when mated to force the fiber into the lens cavity as described above.

The efficiency of the connection between the fibers is sensitive to alignment of the axes of the fibers 133 and 136. Hence, efficiency can be affected adversely by misalignment of the axes of the lens cavities 38 and 39 because the lens cavities form the means to align the fibers. Normally, manufacturing procedures cause the lens cavities to be very slightly misaligned even when the mold for the lens is constructed meticulously. Even these small differences can cause losses in light transmission. This may be compensated for, if desired, by controlling the direction of the bows in the fibers as the assembly is made so that a slight corrective inclination is imparted to the ends of the fibers at the lens cavities.

Figure 11:
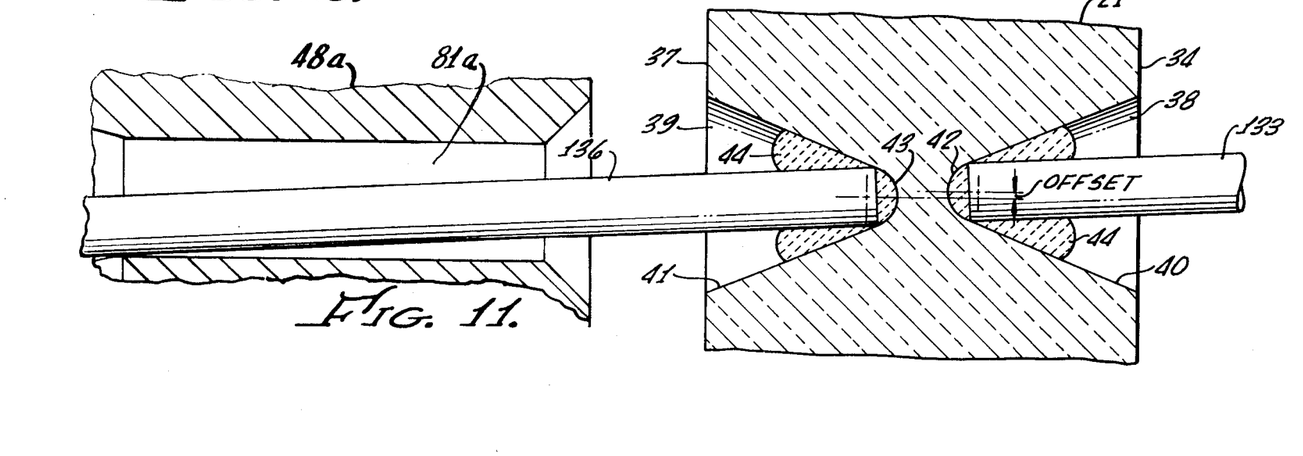
FIG. 11 is an enlarged longitudinal sectional view of the lens portion of the connector, showing in exaggerated form the cavity misalignment and tilting of the optical fibers.

The arrangement for compensating for lens cavity misalignment is shown in exaggerated form in FIG. 11. The direction of the offset of the cavities 38 and 39 is found, such as by photographing the lens from three different angles, then the keyways 45 is cut in the exterior surface of the lens 21 so as to be aligned with the direction of this offset. The lens 21 is positioned in the receptacle shell facing in a direction such that the minimum radial dimension between the lens cavity 38 and the tapered aligning surface 31 is on the side of the lens adjacent the keyway 72 of the receptacle shell. With the slot 83 of the insert 82 also being aligned with this keyway, the fiber 133 will bow toward the keyway.

Similarly, the minimum distance between the center of the lens cavity 39 and the tapered aligning suface on the opposite end of the lens is in the same direction as the keyway 138 in the receptacle shell, which receives the key 71a of the plug 12. The keyway 138 is diametrically opposite from the keyway 72 with respect to the axis of the lens 21. Therefore, the fiber 136 bows toward the keyway 138 and in the opposite direction from the bow in the fiber 133. In this way, the cavity 38 is positioned above the cavity 39, as viewed in FIGS. 10 and 11, and the direction of the offset of the cavities is vertical in these views. The bows in the fibers 133 and 136, being confined in the slots 83 and 83a, are made to fall in the same plane as that of the direction of cavity offset.

Proper assembly of the lens 21 and receptacle shell 17 is assured because the keyway 45 is cut inwardly from the lens end 24, but stops short of the end 29. Therefore, the lens 21 always will face in the same direction when fitted into the receptacle shell 17 because the pin 46 can only enter the open end of the keyway 45.

Figure 10:
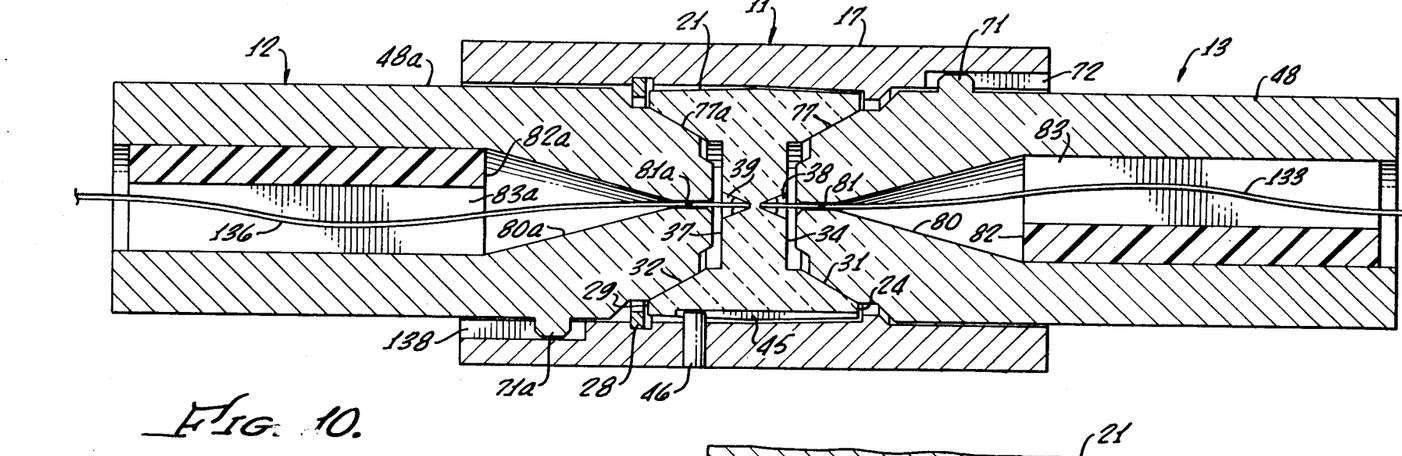
FIG. 10 is a simplified longitudinal sectional view of the connector, illustrating the way in which the fibers are given a shallow inclination to compensate for misalignment of the lens cavities.

There is a slight clearance between the fibers 133 and 136 and the openings 81 and 81a in the front shells 48 and 48a of the plugs 12 and 13. This allows the fibers to be at a slight angle relative to the axes of these openings, with the walls of these openings confining the fibers and limiting the tilt to the fiber ends. The bows in the fibers 133 and 136 will cause them to assume such shallow angles, as a result of which they are slightly misaligned with the axes of the cavities 38 and 39. With the directions in the bows in the fibers being correlated with respect to cavity axis offset, as described above, the end of the fiber 133 is caused to point downwardly and the end of the fiber 136 to point upwardly, with their axes falling in the plane of the bows and the direction of cavity offset. As a result, the fiber ends point toward each other. This creates close alignment of the axes of the fibers 133 and 136 at the lens surfaces to improve efficiency of light transmission irrespective of cavity misalignment. Tests have established that greater connector efficiency can be obtained by following this keying system.

Figure 12:
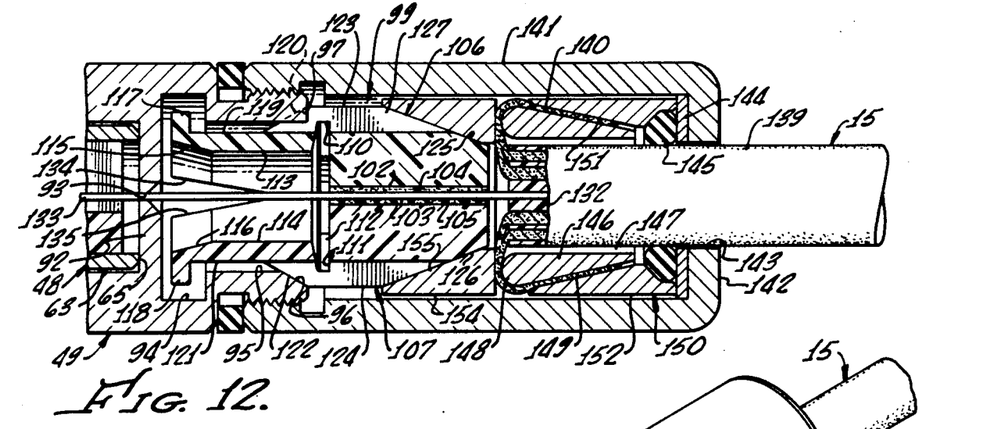
FIG. 12 is a fragmentary longitudinal sectional view of the rearward portion of a modified form of the connector, which includes a cable clamping arrangement.
Figures 13, 14:
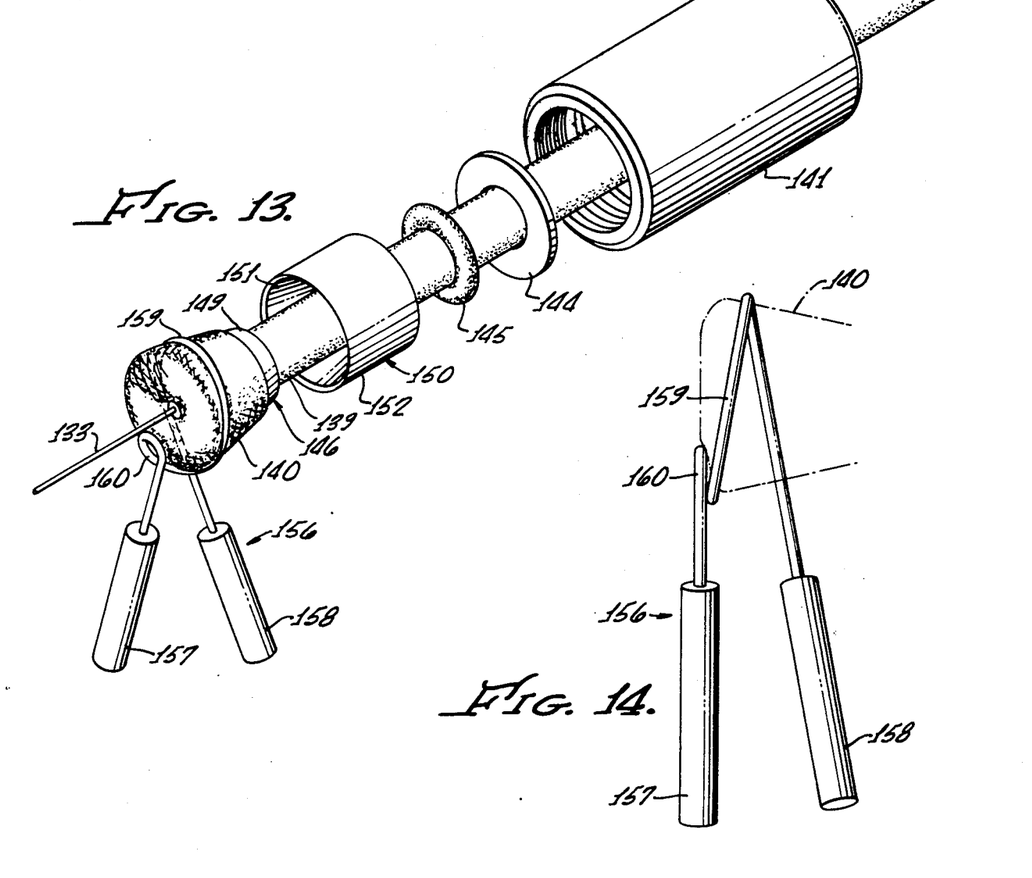
FIG. 13 is a perspective view illustrating the components of the cable clamp and the association of the cable end with the clamp by a special tool prior to assembly.
FIG. 14 is a side elevational view of the tool for associating the end of the cable with the cable clamp.

A cable clamp is incorporated in the back shell nut in the modification illustrated in FIGS. 12 and 13. The optical fiber 15 may include a cable 139 around the protective sheath 132 to provide strength and avoid breakage of the fiber 133. The exterior cable includes a fibrous portion 140 which is held to the connector through the use of the clamping device. The back shell nut 141 in this embodiment is generally similar to the back shell nut 100, but is substantially longer, terminating in a rearward radial wall 142, having a central opening 143 dimensioned to receive the periphery of the cable 139. Interiorly of the wall 142 is a washer 144, which likewise receives the cable 139, beyond which is an O-ring 145. The inner clamping member 146 is tubular in configuration, having a cylindrical inner surface 147, a rounded forward end 148, and a rearwardly tapering frustoconical surface 149 on its exterior. The outer clamping member 150 has an inner frustoconical surface 151 which tapers rearwardly at the same angle as the surface 149 of the inner clamping member 146. The outer surface 152 of the outer clamping member 150 is cylindrical and fits adjacent the inner wall of the nut 141. A recess 153 at the rearward end of the clamping member 150 receives the outer portion of the O-ring 145.

The fibrous material 140 of the cable 139 is extended around the forward end 148 of the clamping member 146 and then doubled back between the tapered surfaces 149 and 151 of the two clamping members. When the nut 141 is tightened, the outer clamping member 150 is biased forwardly to urge the tapered surface 151 toward the tapered surface 149 of the inner clamping member. The forward end 148 of the inner clamping member 146 is adjacent the rearward end of an annual member 154 which has an inner tapered surface 155 that engages the tapered surfaces 125 and 126 of the fiber clamp 99 in this embodiment. This prevents the cable clamping member 146 from moving forwardly and also provides the reaction to actuate the fiber clamp. The end portion of the fibrous material 140, caught between the tapered surfaces 149 and 151, is tightly gripped and cannot escape. Simultaneously, a seal is provided by the compression of the O-ring 145 against the periphery of the cable 139.

It is important in securely holding the cable 139 that the surfaces of the clamping members taper rearwardly. This means that an outward pull on the cable 139 merely tends to move the inner clamping member 146 rearwardly relative to the outer clamping member 150. As a result, the tapered surfaces 149 and 151 are biased toward each other with an even greater force and the fibrous material 140 is more securely held.

The cable is associated with the clamp by means of a tool 156 as seen in FIGS. 13 and 14. The tool 156 is made of resilient wire and includes covered inclined handle portions 157 and 158 from which the wire forms a relatively large loop 159 and a relatively small loop 160 at one side and one end of the larger loop. The free diameter of the large loop 159 is smaller than the diameter of the surface 149 adjacent the forward end 148 of the clamping member 146. However, squeezing the handle portions 157 and 158 together enlarges the loop 159, enabling it to extend over the inner clamping member 146. In this way the loop 159 can be used to help force the fibrous material 140 back over the tapered surface 149. With the fibrous material in this position, the handles 157 and 158 are released to cause the loop 159 to grip the material 140 outside of the surface 149. The smaller loop 160 bears against the portion of the material 140 which extends around the forward end 148 of the clamping member 146. This acts as a stop so that the larger loop 159 can extend rearwardly only a limited distance over the clamping member 146.

With the fibrous material held in this manner adjacent the forward end of the clamping member 146, the outer clamping member 150 then is slid forwardly over the inner clamping member 146, at which time the loop 159 of the tool 156 is expanded and removed from the periphery of the inner clamping member. When the outer clamping member 150 fits over the doubled-back portion of the material 140, it will hold it in place between the tapered surfaces as the back shell nut is moved over these elements and the assembly is completed.

Modifications can be made in the construction described above while retaining many of its advantages. For example, the receptacle portion of the connection may contain a different arrangement for transmitting light from one fiber to another, yet still provide for alignment by means of the tapered surfaces as set out above. A light emitter or detector may be incorporated in the receptacle, in which event only one of the plugs will be used.

The foregoing detailed description is to be clearly understood as given by way of illustration and example only, the spirit and scope of this invention being limited solely by the appended claims.

We claim:

1. A device for connecting an optical fiber in a light-transmissive relationship with another object comprising a first member having receiving means for receiving the end portion of an optical fiber in a light-transmissive relationship therewith, a second member, means for selectively connecting said second member to and disconnecting said second member from said first member, an optical fiber having an end portion, and means for retaining said optical fiber to said second member, said retaining means including means for extending said end portion of said optical fiber relative to said second member for being received by said receiving means of said first member when said second member is connected to said first member, and means for retracting said end portion of said optical fiber relative to said second member when said second member is disconnected from said first member for protecting said end portion of said optical fiber when said second member is so disconnected.

2. A device as recited in claim 1 which
said second member includes an opening,
said end portion of said optical fiber extending through said opening when
said second member is connected to said first member,
said end portion being retracted so that it is entirely within said opening when said second member is disconnected from said first member.

3. A device for connecting an optical fiber in a light-transmissive relationship with another object comprising
a first member having means for receiving the end portion of an optical fiber, and tapered surface means, a second member adjacent said first member, said second member including a first portion and a second portion, said second portion being movable relative to said first portion and having tapered surface means engaging said tapered surface means of said first member, an optical fiber having an end portion, gripping means carried by said second member for gripping said optical fiber only at a location remote from said end portion thereof, said optical fiber projecting from said second member so that said end portion is received in said first member, and means for removably connecting said first and second members together, said connecting means including resilient means for biasing said second portion of said second member toward said first member so that said tapered surface means of said first and second members cooperate to align said first and second members.

4. A device as recited in claim 3 in which said means for receiving the end portion of an optical fiber includes means defining a cavity which has an inwardly convergent surface, and when said first and second members are so connected together said end portion of said optical fiber is biased axially against said inwardly convergent surface for thereby aligning and positioning said fiber relative to said cavity.

5. A device as recited in claim 3 in which said means for receiving the end portion of an optical fiber includes means defining a cavity, and said second member includes an opening adjacent said first member, said opening being substantially aligned with said cavity, said optical fiber extending through said opening and being guided thereby into substantial alignment with said cavity.

6. A device for connecting an optical fiber in a light-transmissive relationship with another object comprising a first member having means for receiving the end portion of an optical fiber, and a tapered surface means, a second member adjacent said first member, said second member having tapered surface means engaging said tapered surface means of said first member, an optical fiber having an end portion, gripping means carried by said second member for gripping said optical fiber remote from said end portion thereof, said optical fiber projecting from said second member so that said end portion is received in said first member, means for removably connecting said first and second members together, said connecting means including means for biasing said second member toward said first member so that said tapered surface means of said first and second members cooperate to align said first and second members, and means for causing said end portion of said fiber to retract into said second member when said first and second members are not so connected for protecting said end portion of said fiber.

7. A device for connecting an optical fiber in a light-transmissive relationship with another object comprising a first member having means for receiving the end portion of an optical fiber, and a tapered surface means, a second member adjacent said first member, said second member having tapered surface means engaging said tapered surface means of said first member, an optical fiber having an end portion, gripping means carried by said second member for gripping said optical fiber remote from said end portion thereof, said optical fiber projecting from said second member so that said end portion is received in said first member, means for removably connecting said first and second members together, said connecting means including means for biasing said second member toward said first member so that said tapered surface means of said first and second members cooperate to align said first and second members, and a receptacle defining a chamber receiving said first member, said chamber being dimensioned to allow limited floating movement of said first member relative to said receptacle so that said tapered surface means of said first and second members can so cooperate to align said first and second members.

8. A device for connecting an optical fiber in a light-transmissive relationship with another object comprising a first member having means for receiving the end portion of an optical fiber, and a tapered surface means, a second member adjacent said first member, said second member having tapered surface means engaging said tapered surface means of said first member, an optical fiber having an end portion, gripping means carried by said second member for gripping said optical fiber remote from said end portion thereof, said means for gripping said optical fiber including a dualty of resilient members positioned one on either side of said optical fiber, and means for biasing said resilient members toward each other so that said resilient members engage said optical fiber and grip the same, said optical fiber projecting from said second member so that said end portion is received in said first member, and means for removably connecting said first and second members together, said connecting means including means for biasing said second member toward said first member so that said tapered surface means of said first and second members cooperate to align said first and second members.

9. A device as recited in claim 8 in which each of said resilient members is a substantially flat pad of elastomeric material.

10. A device as recited in claim 9 in which said means for biasing said resilient members toward each other includes a dualty of substantially rigid members, each of which is provided with a recess receiving one of said resilient members.

11. A device as recited in claim 8 in which said means for biasing said resilient members toward each other includes
a duality of substantially rigid outer members, each of which engages one of said resilient members, and means for urging said outer members toward each other for causing said outer members to cause said resilient members to so move toward each other, said outer members having interengageable surfaces for limiting the amount of such movement toward each other for thereby limiting the force imposed on said optical fiber by said resilient members.

12. A device as recited in claim 11 in which
each of said outer members includes a forwardly tapering forward surface and a rearwardly tapering rearward surface,
said second member having a rearwardly flaring surface engaged by said forwardly tapering surfaces of said outer members,
and including a nut having a forwardly flaring surface engaging said rearwardly tapering surfaces of said outer members,
said second member having threads engaged by the threads of said nut,
whereby when said nut is advanced on said threads of said second member said tapered and flaring surfaces react to urge said outer members toward each other.

13. A device for connecting an optical fiber in a light-transmissive relationship with another object comprising
a first member having
means for receiving the end portion of an optical fiber, and a tapered surface means,
a second member adjacent said first member,
said second member having
tapered surface means engaging said tapered surface means of said first member,
said second member including a first element and a second element movable relative to said first element,
said tapered surface means of said second member being on said first element, said gripping means being carried by said second element,
an optical fiber having an end portion, gripping means carried by said second member for gripping said optical fiber remote from said end portion thereof,
said optical fiber projecting from said second member so that said end portion is received in said first member, and
means for removably connecting said first and second members together, said connecting means including resilient means interposed between portions of said first and second elements for biasing said second element in one direction relative to said first element such that when said first and second members are disconnected, said second element is moved relative to said first element a distance to cause said gripping means to move said optical fiber so that said end portion thereof is retracted into said first element,
and a connecting member for releasably engaging said first member, said connecting member having surface means for engaging said second element for moving said second element in the opposite direction relative to said first element in opposition to said resilient means when said connecting member is so engaging said first member,
for thereby causing said resilient means to bias said first element toward said first member and said tapered surface means of said second member to be pressed against said tapered surface means of said first member so that said tapered surface means of said first and second members cooperate to align said first and second members.

14. A device as recited in claim 13 in which said first and second elements are in a telescoping relationship for guiding said elements when said first and second elements are so moved relative to each other.

15. A device as recited in claim 13 in which
said first member includes threads thereon,
said connecting member being a sleeve having threads at one end thereof for engaging said threads of said first member, and a shoulder adjacent its opposite end,
said second element having an abutment engageable by said shoulder whereby said shoulder comprises said surface means for engaging said second element for moving said second element.

16. An optical fiber connector comprising
a lens member having first and second opposite ends,
said first and second ends including first and second cavities, respectively,
said cavities being opposite from each other,
said first and second ends having first and second tapered surface means, respectively,
a first member adjacent said first end of said lens member,
a second member adjacent said second end of said lens member,
said first member including a first portion and a second portion,
said first portion of said first member being movable relative to said second portion of said first member and having tapered surface means engaging said first tapered surface means of said lens member,
said second member including a first portion and a second portion,
said first portion of said second member being movable relative to said second portion of said second member and having tapered surface means engaging said second tapered surface means of said lens member,
a first optical fiber carried by said first member and having an end portion projecting therefrom into said first cavity,
a second optical fiber carried by said second member and having an end portion projecting therefrom into said second cavity,
said first and second members including means for gripping said first and second fibers, respectively, only at locations remote from the ends thereof and so that the ends of said fibers are pressed axially into said cavities,
and means for connecting said first and second members to said lens member, said connecting means including resilient means for biasing said first portions of said first and second members toward said lens member so that said tapered surface means of said first and second members are pressed against said first and second tapered surface means of said lens member for aligning said first and second members with said lens member.

17. A device as recited in claim 16 in which each of said first and second tapered surface means of said lens member is defined by an inwardly convergent frustoconical surface, and said tapered surface means of each of said first and second member is defined by an outwardly convergent frustoconical surface.

18. A device as recited in claim 17 in which said outwardly convergent frustoconical surface of said first member is complementary to said first tapered surface means of said lens member, and said outwardly convergent frustoconical surface of said second member is complementary to said second tapered surface means of said lens member.

19. An optical fiber connector comprising
a lens member having first and second opposite ends,
said first and second ends including first and second cavities, respectively,
said cavities being opposite from each other,
said first and second ends having first and second tapered surface means, respectively,
a first member adjacent said first end of said lens member,
a second member adjacent said second end of said lens member,
said first member having tapered surface means engaging said first tapered surface means of said lens member,
said second member having tapered surface means engaging said second tapered surface means of said lens member,
a first optical fiber carried by said first member and having an end portion projecting therefrom into said first cavity,
a second optical fiber carried by said second member and having an end portion projecting therefrom into said second cavity,
said first and second members including means for gripping said first and second fibers, respectively, so that the ends of said fibers are pressed axially into said cavities,
a receptacle receiving said lens member,
said receptacle having thread means thereon, and including,
a first threaded element engaging said thread means and said first member for holding said first member to said receptacle, and
a second threaded element engaging said thread means and said second member for holding said second member to said receptacle,
and means for biasing said first and second members toward said lens member so that said tapered surface means of said first and second members are pressed against said first and second tapered surface means of said lens member for aligning said first and second members with said lens member.

20. A device as recited in claim 19 in which said means for biasing said first and second members toward said lens member includes a first compression spring biasing said first member toward said lens member, and a second compression spring biasing said second member toward said lens member.

21. An optical fiber connecter comprising
a lens member having first and second opposite ends,
said first and second ends including first and second cavities, respectively,
said cavities being opposite from each other,
said first and second ends having first and second tapered surface means, respectively,
a first member adjacent said first end of said lens member,
a second member adjacent said second end of said lens member,
said first member having tapered surface means engaging said first tapered surface means of said lens member,
said second member having tapered surface means engaging said second tapered surface means of said lens member, said first and second members being removable from said lens member,
a first optical fiber carried by said first member and having an end portion projecting therefrom into said first cavity,
a second optical fiber carried by said second member and having an end portion projecting therefrom into said second cavity,
said first and second members including means for gripping said first and second fibers, respectively, so that the ends of said fibers are pressed axially into said cavities,
means for biasing said first and second members toward said lens member so that said tapered surface means of said first and second members are pressed against said first and second tapered surface means of said lens member for aligning said first and second members with said lens member, and means for retracting said first and second fibers into said first and second members when said first and second members are removed from said lens member.

22. An optical fiber connector comprising
a lens member having first and second opposite ends,
said first and second ends including first and second cavities, respectively,
said cavities being opposite from each other,
said first and second ends having first and second tapered surface means, repsectively,
a first member adjacent said first end of said lens member,
a second member adjacent said second end of said lens member,
said first member having tapered surface means engaging said first tapered surface means of said lens member,
said second member having tapered surface means engaging said second tapered surface means of said lens member,
a first optical fiber carried by said first member and having an end portion projecting therefrom into said first cavity,
a second optical fiber carried by said second member and having an end portion projecting therefrom into said second cavity,
said first and second members including means for gripping said first and second fibers, respectively, so that the ends of said fibers are pressed axially into said cavities,
each of said first and second optical fibers defining a bow inwardly of said end portion thereof,
means for positioning said lens member in a predetermined angular relationship relative to said first and second members,
whereby said lens member has a predetermined angular relationship relative to said bows in said first and second fibers, and means for biasing said first and second members toward said lens member so that said tapered surface means of said first and second members are pressed against said first and second tapered surface means of said lens member for aligning said first and second members with said lens member.

23. A device as recited in claim 22 in which
said cavities in said lens member are offset in a predetermined direction,
and including means for angularly positioning said lens member relative to said first and second members such that said predetermined direction and the directions of said bows all fall in the same plane.

24. A device as recited in claim 23 in which each of said first and second members includes an opening,
said opening in said first member including a portion adjacent said first cavity which relatively closely confines said first optical fiber but is of larger transverse dimension than that of said first optical fiber,
whereby said bow in said first optical fiber causes said first optical fiber to tilt at a shallow angle relative to the axis of said first cavity,
and said opening in said second member including a portion adjacent said second cavity which relatively closely confines said second optical fiber but is of larger transverse dimension than that of said second optical fiber,
whereby said bow in said second optical fiber causes said second optical fiber to tilt at a shallow angle relative to the axis of said second cavity,
whereby said first and second optical fibers are caused to more nearly assume axial alignment than the axial alignment of said first and second cavities.

25. An optical fiber connector comprising
a lens member having a first and second opposite ends,
said first and second ends including first and second cavities, respectively,
said cavities being opposite from each other,
said first and second ends having first and second tapered surface means, respectively,
a first member adjacent said first end of said lens member,
a second member adjacent said second end of said lens member,
said first member having tapered surface means engaging said first tapered surface means of said lens member,
said second member having tapered surface means engaging said second tapered surface means of said lens member,
a first optical fiber carried by said first member and having an end portion projecting therefrom into said first cavity,
a second optical fiber carried by said second member and having an end portion projecting therefrom into said second cavity,
said first and second members including means for gripping said first and second fibers, respectively, so that the ends of said fibers are pressed axially into said cavities,
means for biasing said first and second members toward said lens member so that said tapered surface means of said first and second members are pressed against said first and second tapered surface means of said lens member for aligning said first and second members with said lens member,
and a receptable defining a chamber receiving said lens member,
said lens member having a smaller external dimension than the internal dimension of said chamber,
whereby said lens member has freedom for limited floating movement relative to said receptacle, so as to enable said tapered surface means to so align said first and second members with said lens member.

26. A device as recited in claim 25 in which
said first member includes
a first front shell defining said tapered surface means of said first member,
a first rear shell movable relative to said front shell,
and a first means for gripping said first optical fiber carried by said first rear shell,
whereby when said first rear shell is moved relative to said first front shell said first optical fiber is moved relative to said first front shell,
said first front shell having an opening through which said first optical fiber extends,
said first optical fiber projecting from said opening in said first front shell into said first cavity, and
said second member includes
a second front shell defining said tapered surface means of said second member,
a second rear shell movable relative to said front shell,
and a second means for gripping said second optical fiber carried by said second rear shell,
whereby when said second rear shell is moved relative to said second front shell said second optical fiber is moved relative to said second front shell,
said second front shell having an opening through which said second optical fiber extends,
said second optical fiber projecting from said opening in said second front shell into said second cavity.

27. A device as recited in claim 26 in which
said opening in said first front shell includes space for accommodating a bow in said first optical fiber,
said opening in said second front shell includes space for accommodating a bow in said second optical fiber,
said first optical fiber has a bow in said space in said first front shell, and
said second optical fiber has a bow in said space in said second front shell.

28. A device as recited in claim 27 in which
said first front shell includes a first guide means for confining said bow in said first optical fiber to a predetermined radial direction, and
second second front shell includes a second guide means for confining said bow in said second optical fiber to a predetermined radial direction,
said first and second guide means including means for causing said first and second fibers to bow in opposite directions.

29. A device as recited in claim 28 in which
said first guide means includes a body defining a first slot, and
said second guide means includes a body defining a second slot,
said first and second slots being diametrically opposite relative to the longitudinal axis of said lens member for causing said first and second optical fibers to bow in opposite directions.

30. A device as recited in claim 26 including means for preventing relative rotation of said first and second front shells and said receptable,
means for preventing rotation of said first rear shell relative to said first front shell, and
means for preventing rotation of said second rear shell relative to said second front shell.

31. A device as recited in claim 26 including
means for moving said first rear shell relative to said first front shell comprising
a first threaded member,
said receptacle having first threads engaged by said first threaded member,
said first threaded member having abutment means thereon,
said first rear shell having abutment means thereon engaged by said abutment means of said first threaded member,
whereby rotation of said first threaded member causes said movement of said first rear shell, and
means for moving said second rear shell relative to said second front shell comprising
a second threaded member,
said receptacle having second threads engaged by said second threaded member,
said second threaded member having abutment means thereon,
said second rear shell having abutment means thereon engaged by said abutment means of said second threaded member,
whereby rotation of said second theaded member causes said movement of said second rear shell.

32. A device as recited in claim 26 in which
said first rear shell telescopingly receives said first front shell and is guided thereby such that said first rear shell can move in two directions relative to said first front shell,
said second rear shell telescopingly receives said second front shell and is guided thereby such that said second rear shell can move in two directions relative to said second front shell, and including
a first resilient means engaging said first front shell and said first rear shell for biasing said first rear shell in one of said directions,
a first threaded means for moving said first rear shell in the other of said directions in opposition to said first resilient means for causing said first resilient means to bias said first front shell toward said first end of said lens member for so pressing said tapered surface means of said first member against said first tapered surface means of said lens member,
a second resilient means engaging said second front shell and said second rear shell for biasing said second rear shell in one of said directions,
a second threaded means for moving said second rear shell in the other of said directions in opposition to said second resilient means for causing said second resilient means to bias said second front shell toward said second end of said lens member for so pressing said tapered surface means of said second member against said second tapered surface means of said lens member.

33. A device as recited in claim 32 in which
said receptacle includes threads thereon,
said first and second threaded means releasably engaging said threads of said receptacle,
said first resilient means moving said first rear shell in said one direction relative to said first front shell when said first threaded means is released from engagement with said threads of said receptacle,
said movement of said first rear shell being sufficient to cause said first gripping means to retract said first optical fiber into said opening in said first front shell,
said second resilient means moving said second rear shell in said one direction relative to said second front shell when said second threaded means is released from engagement with said threads of said receptacle,
said movement of said second rear shell being sufficient to cause said second gripping means to retract said second optical fiber into said opening in said second front shell.

34. An optical fiber connector comprising
a lens member having first and second opposite ends,
said first and second ends including first and second cavities, respectively,
said cavities being opposite from each other,
said first and second ends having first and second tapered surface means, respectively,
a first member adjacent said first end of said lens member,
a second member adjacent said second end of said lens member,
said first member having tapered surface means engaging said first tapered surface means of said lens member,
said second member having tapered surface means engaging said second tapered surface means of said lens member,
a first optical fiber carried by said first member and having an end portion projecting therefrom into said first cavity,
a second optical fiber carried by said second member and having an end portion projecting therefrom into said second cavity,
said first and second members including means for gripping said first and second fibers, respectively, so that the ends of said fibers are pressed axially into said cavities,
said means for gripping said first optical fiber including a duality of first resilient members positioned one on either side of said first optical fiber, and
means for biasing said first resilient members toward each other so that said first resilient members engage said first optical fiber and grip the same,
said means for gripping said second optical fiber including a duality of second resilient members positioned one on either side of said second optical fiber, and
means for biasing said second resilient members toward each other so that said second resilient members engage said second optical fiber and grip the same,
and means for biasing said first and second members toward said lens member so that said tapered surface means of said first and second members are pressed against said first and second tapered surface means of said lens member for aligning said first and second members with said lens member.

35. In combination with an optical fiber having a light-conductive inner member and a cable around said inner member, and a cable clamping device having first and second clamping members with said first clamping member having a forward end, a rearward end and a rearwardly convergent outer tapered surface, and said second clamping member being adapted to be extended over said first clamping member, a tool for associating the cable means of an optical fiber unit with said clamping device comprising a unitary resilient wire member,
- defining handle portions,
- a first relatively large loop,
- and a second relatively small loop at one side and at one end of said relatively large loop,
- said relatively large loop having a free diameter less than the diameter of said outer tapered surface of said first clamping member inwardly of said forward end thereof,
- whereby upon relative movement of said handle portions said relatively large loop can be expanded for fitting over an end portion of said cable means and said forward end of said first clamping member, and upon release of said handle portions can grip said cable means around said tapered surface of said first clamping member, and said relatively small loop can engage said cable means adjacent said forward surface of said first clamping member for limiting the distance said relatively large loop is extended over said tapered surface of said first clamping member to enable said second clamping member to be extended over said end portion of said cable means and said first clamping member.

36. The method of aligning the axes of first and second optical fibers to be connected by a member having first and second outwardly facing cavities opposite from each other adapted to receive the ends of said fibers, with the axes of said cavities being offset, comprising the steps of
- determining the direction of said offset of said cavities,
- positioning said member so that said first cavity is above said second cavity,
- extending said first optical fiber into said first cavity and inclining said first optical fiber downwardly,
- extending said second optical fiber into said second cavity and inclining said second fiber upwardly, and
- positioning said direction of offset and the axes of said first and second fibers so that they fall in the same plane.

37. The method as recited in claim 36 in which said first and said second optical fibers are pressed into said first and second cavities, respectively, so as to be caused to bow outwardly of said first and second cavities,
- said bows being formed in opposite directions and made to fall in said plane for so inclining and positioning the axes of said fibers.

38. The method as recited in claim 37 in which
- a member is provided for each of said fibers, each of which defines a slot,
- said bows of said fibers are formed in said slots and confined in directions thereby, said slots are positioned in said plane, and said slots are made to extend in opposite directions for so causing said fibers to bow in opposite directions.

39. The method as recited in claim 37 in which each of said fibers is confined adjacent the one of said cavities receiving the same for limiting the amount of inclination of said fibers at said cavities.

40. The method as recited in claim 39 in which for so confining said fibers
- a member is provided for each of said fibers each of which defines a cylindrical opening,
- and said fibers are extended through said openings between said bows thereof and said cavities,
- each of said openings being made to a larger transverse dimension than the transverse dimension of the fiber received therein.

41. A clamp for holding an optical fiber comprising
- a duality of resilient members adapted to engage opposite sides of an optical fiber,
- a duality of substantially rigid members, each of which engages one of said resilient members,
- means for urging said substantially rigid members toward each other for causing said substantially rigid members to urge said resilient members toward each other for gripping an optical fiber between said resilient members,
- and means for limiting the force on said resilient members imposed by said substantially rigid members.

42. A device as recited in claim 41 in which said means for limiting the force on said resilient members includes interengageable surfaces on said substantially rigid members.

43. A device as recited in claim 42 in which said resilient membes are substantially flat pads of elastomeric material.

44. A device as recited in claim 43 in which each of said substantially rigid members includes a recess receiving one of said resilient members.

* * * * *

UNITED STATES PATENT AND TRADEMARK OFFICE
CERTIFICATE OF CORRECTION

PATENT NO. : 4,190,316
DATED : February 26, 1980
INVENTOR(S) : MARC W. MALSBY; JOHN S. DOTY; JAYANTILAL N. PATEL It is certified that error appears in the above-identified patent and that said Letters Patent are hereby corrected as shown below:

Column 11, line 3, after "and" --- a --- should be inserted.

Column 16, line 40, "repsectively" should be --- respectively ---.

Column 18, line 53, first "second" should be --- said ---.

Signed and Sealed this

First Day of July 1980

[SEAL]

Attest:

SIDNEY A. DIAMOND

Attesting Officer

Commissioner of Patents and Trademarks